Patented Apr. 5, 1938

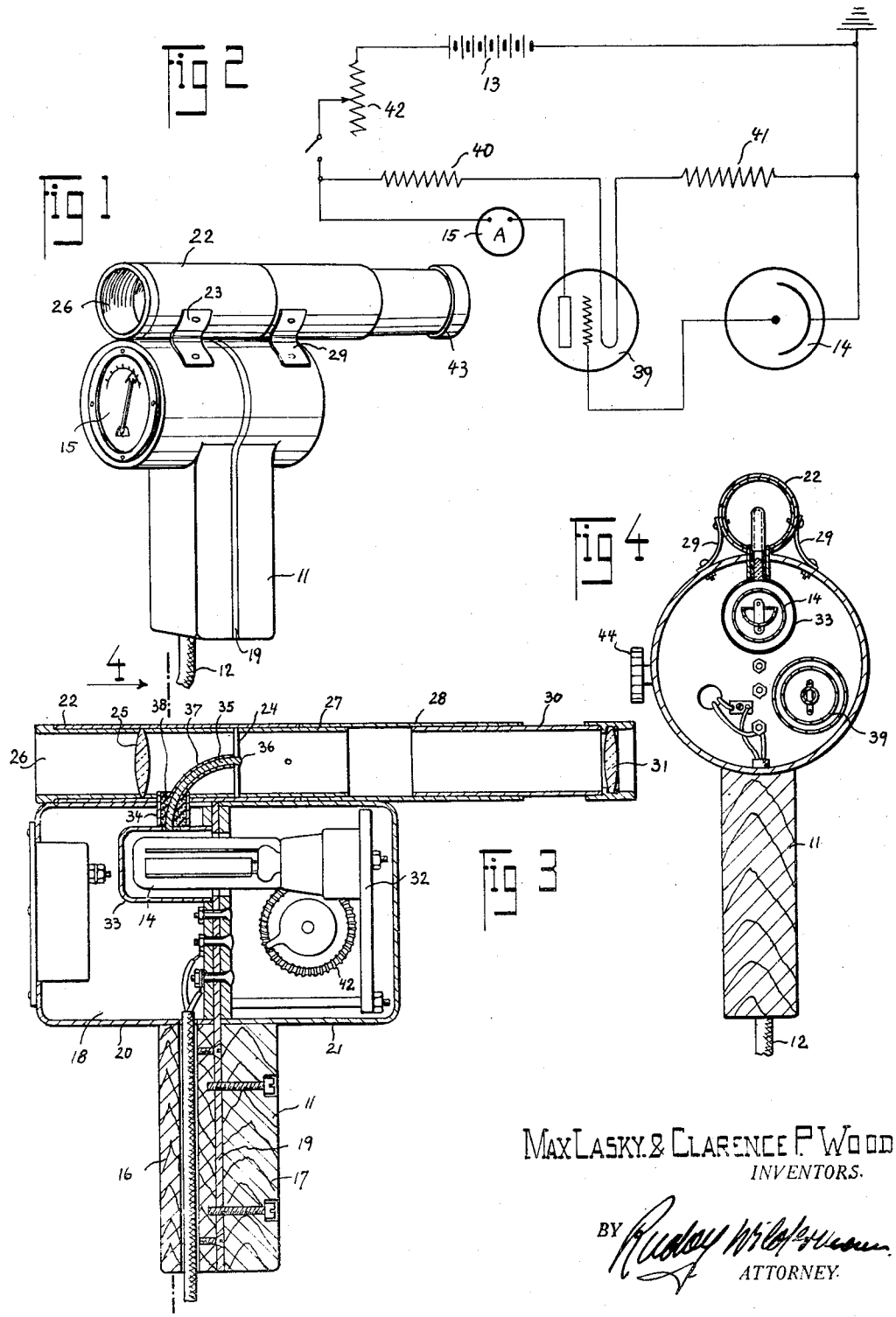

2,113,450

UNITED STATES PATENT OFFICE 2,113,450

PYROSCOPE

Max Lasky and Clarence P. Wood, New York, N. Y., assignors to Polymet Manufacturing Corporation, New York, N. Y., a corporation of Delaware Application January 22, 1934, Serial No. 707,716

12 Claims. (Cl. 73—355)

This invention relates to a pyroscope, i. e., an instrument for measuring temperatures.

One object of this invention is to provide an instrument which may be set up at any distance from the object, the heat of which is to be measured, and preferably a portable instrument, which permits the reading of temperatures.

It is another object of this invention to determine the temperature of an object by observing the object itself, so that the actual temperature thereof is determined, not that of the surrounding atmosphere.

To those acquainted with this art, a relationship to the optical pyrometer will suggest itself. But in an optical pyrometer we ordinarily read by comparison. We therefore call upon faculties of the observer in matching the visible radiation of the object against a fixed or variable or adjustable standard. The optical pyrometer is therefore subjected to the exercise of selected human faculties. It requires discrimination and discernment.

By way of contrast with the optical pyrometer the apparatus of this invention intends a direct reading of temperature relying only on the ordinary functions of the human eye in reading a scale and in using a telescope.

In the same manner in which in the optical pyrometer a selection of the visible radiation may be made by the use of filters, rays particularly indicative of the heat may be analogously selected in the present invention for the purpose of reading temperature. But the optical pyrometer is limited to the range of the visible spectrum, whereas we aim to go beyond the visible spectrum, into the realm of infra red, for instance, so that we read in terms of radiant energy, which is not actually visible to the eye. Thus a vast field of heat measurements is opened; by reading radiant energy we may selectively cover the whole range of temperatures practically contended with, in both directions beyond the comparatively limited readings within the visible spectrum of the old art.

The following description exemplarily discloses a very simple, readily usable execution of our invention, it being understood that within the knowledge and means available to those acquainted with this art, the applicability of this invention may be carried much further in respect to range as well as precision; for instance, where reference is had to a lens for predeterminedly focusing the radiated energy, a substitution readily suggests itself of a lens made of material with the particular property of allowing passage of invisible ultra-violet rays, or of exclusively passing radiant energy within a limited range of wave lengths.

In the drawing:

Fig. 1 shows a perspective view of an exemplary execution of our pyrometer.

Fig. 2 shows a wiring diagram indicating the manner in which the electrical connect'ns may be made.

Fig. 3 shows a longitudinal section of said pyrometer.

Fig. 4 shows a transverse cross-section of said pyrometer taken in the direction indicated and referred to in Fig. 3.

Similar numerals refer to similar parts throughout the various views.

The pyrometer may be supplied with electric current from any suitable constant source which may be accommodated in the instrument itself, for instance, the handle 11 thereof. But electric current may also be drawn from a supply line available within convenient distance from the point where an observation is to be made, by plugging in on such a supply line by way of a suitable extension cord 12. Furthermore we may provide a current source, such as a B battery 13, in a carrying case (not shown), to which the pyrometer connects by way of cord 12, and in which the pyrometer may be suitably accommodated, and stored or carried, when not actually used.

The electric current supply serves to translate into visible readings, on the scale of a meter 15 for instance, the radiant energy received by a radiant energy sensitive element 14.

The radiant energy converted for reading is suitably selected from the radiant energy radiated by the object, the temperature or radiation of which is to be measured. Means for selecting a part of the radiant energy for the purpose of our readings are indicated by devices which comprise a camera obscura disposed in the manner of a telescope in order to facilitate the directing thereof onto the object to be observed, and means for propagating selected radiation received at a unit area of the camera obscura to a radiant energy sensitive element. The current fluctuations impressed upon the radiant energy sensitive element 14 are suitably amplified and transmitted to a current measuring instrument, such as milliammeter 15, which is suitably calibrated, to read lumens, lamberts or degrees of temperature for instance.

The handle 11 comprises a reenforcing plate 19 to which are assembled suitable lugs 16 and 17 preferably of insulating material, shaped to facilitate the handling of the instrument. Through one of said lugs extends the cord 12 into the housing 18 which is also assembled, for structural purposes, upon the reenforcing plate 19. The housing 18 comprises the two compartments 20 and 21 in which are accommodated the electrical parts. Upon the housing 18 are superimposed tubes serving for the observation and selection of the radiant energy to be measured. Such a tube 22 is assembled by means of straps 23 with the compartment 20; in said tubing is mounted a translucent means 24, a screen analogous to the ground glass used in a camera for directing and focusing. Fixedly spaced respect to means 24 a lens 25 is mounted in tube 22 and serves to protect the entrance of the tube, and at the same time to enlarge the showings projected onto means 24 for the eye of the observer, which is applied to the opening 26 of tube 22. Tubings fitted into tube 22 serve to space means 24 and lens 25 and one of said tubings, 27, extends from the right end of the tube 22 and serves for the alignment of tube 28 which slidably fits thereover and is assembled to compartment 21 by a strap 29. While the tubings so far discussed are in a fixed relationship to the assembled pyroscope, a focusing barrel 30 is frictionally, slidably in telescope fashion, retained in the right end of tube 28 and protrudes therefrom. The optical means accommodated in barrel 30 are indicated by a lens 31 mounted at the extreme end thereof and the operator longitudinally adjusts the barrel 30 in tubing 28 in order to focus the radiant energy entering through lens 31 onto the translucent means 24.

Thus the parts superimposed upon housing are defined as a finder: the user lifts the instrument to the eye, directs the lens 31 to the object to be observed and adjusts the barrel 30 until a clear picture, heat-representative of a part of the object at a selected part of the translucent means 24 Then he may read the heat as registered by meter 15.

Part of the radiant energy projected onto the translucent means 24 is applied to the radiant energy sensitive element 14 which may be a photo-electric cell. In Fig. 3 the photo-electric cell is shown to be mounted upon a base 32 which is spaced in respect to plate 19 and accommodated in compartment 21. The cell 14 extends thru a suitable opening from compartment 21 into compartment 20 and is there shielded by enclosure 33. Openings are provided in enclosure 33, in compartment 20, and in the tubings superimposed thereabove, and are lined by a sleeve extending therethrough.

By way of the sleeve 34 the radiation received at a selected part of the translucent means 24 may be transmitted to the cell 14. As a radiant energy conductor serves a fused quartz rod 35, which is bent substantially in a quarter circle, and which is seated at one end in a suitable perforation 36 in the translucent means 24. In order to protect the eye applied to opening 26 against the light conducted by the fused quartz rod 35, a suitable opaque covering 37, a coating of lacquer for instance, is applied to the part of rod 35 extending through tubing 22. The part of rod 35 extending through sleeve 34 may be suitably guided therein. In the drawing we show a resilient means 38, made of sponge rubber for instance, which thus guides the free end of the rod 37, the bare end of the rod facing the photo-electric tube 14.

The housing 18 also accommodates a triode 39, which amplifies the impulses of radiant energy received by element 14, the resistors 40 and 41 and rheostat 42, completing the circuit of Fig. 2. The rheostat 42 controls the current applied from battery 13, by way of cord 12, to the pyrometer and it serves for adjusting the instrument to a zero setting. For the purpose of such a setting we either cover the end of tubing 30 by a cap 43, which shuts off light, and may also apply such a cap to the entrance 36, or the adjustment is made while the instrument is contained in the carrying case in which no light is admitted to the optical parts of the device. For the purpose of allowing such adjustments before and during use of the instrument, the handle 44 of rheostat 42 is disposed outside of compartment 21.

The arrangement shown allows the operator to focus the device onto a selected spot of the object to be observed. He can observe on translucent means 24 the parts surrounding the area from which radiant energy is projected onto the end of quartz rod 35, so that he ascertains, that the radiant energy of a representative, preferred area is projected onto the end of the quartz rod 35.

Since the area of the object observed increases in proportion to the decrease of the effectiveness of the radiant energy received by the end of quartz rod 35, as the distance between the pyroscope and the object observed is increased, readings will be substantially unaffected by the distance from the object at which the readings are taken.

Vice versa it is clear that the arrangement of the optical parts,—such as the lens 31 in relation to the irradiated end of the quartz rod,—is to be substantially such, that the solid angle of the radiation converted for measurements, as shown to be subtended by the end of the quartz rod, remains constant and that the solid angle, subtended by the area of the object to be observed from which said radiation is emanated, remains substantially constant to the extent possible in combination with accurate focusing, regardless of the distance at which the observation is made; the observation is preferably made in a direction substantially normal to the radiating surface.

Although we have shown and described one form of embodiment of our invention in detail, yet we do not wish to be limited thereby, except as the state of the art and the appended claims may require, for it is obvious that various modifications and changes may be made in the form of embodiment of our invention, without departing from the spirit and scope thereof.

We claim:

1. In a pyrometer the combination with a radiant energy sensitive element and means registering the reactions of said element, of means transmitting to said element radiant energy received at said pyrometer, and of an optical finder partly branched off from and partly merged with said transmitting means, disposed in the direction in which said radiant energy is to be received and serving to view the surroundings of the measured area.

2. In a pyrometer the combination with a radiant energy sensitive element and means registering the reactions of said element, of a camera obscura into which radiant energy projects, of means for observing the radiant energy projected into said camera, and of means opening upon said camera obscura and conducting a solid angle of the radiant energy received in said camera to said element.

3. In a pyrometer the combination with a radiant energy sensitive element and means registering the reactions of said element, of an optical finder, and of a translucent screen in said finder onto which an image of the object to be observed is projected, said screen being perforated in order to permit passage of some of the projected rays towards said element.

4. In a pyrometer the combination with a radiant energy sensitive element and means registering the reactions of said element, of an optical finder, of a translucent screen in said finder onto which an image of the object to be observed is projected, and of a radiant energy conductor extending from said screen towards said element.

5. In a pyrometer the combination with a radiant energy sensitive element and means registering the reactions of said element, of an optical finder, of a translucent screen in said finder onto which an image of the object to be observed is projected, and of a quartz rod extending from said screen towards said element.

6. In a pyrometer the combination with a radiant energy sensitive element and means registering the reactions of said element, of an optical finder, of a translucent screen in said finder onto which an image of the object to be observed is projected, and of a radiant energy conductor seated upon said screen and issuing upon said element.

7. In a pyrometer the combination with a radiant energy sensitive element and means registering the reactions of said element, of an optical finder, of a translucent screen in said finder onto which an image of the object to be observed is projected, of a radiant energy conductor seated upon said screen and issuing upon said element, and of opaque means covering part of said conductor.

8. In a pyrometer the combination with a radiant energy sensitive element and means registering the reactions of said element, of an optical finder, of a translucent screen in said finder onto which an image of the object to be observed is projected, of a radiant energy conductor seated upon said screen and issuing upon said element, and of a covering on said conductor where it traverses the path of vision in said finder.

9. In a pyrometer the combination with a radiant energy sensitive element and means registering the reactions of said element, of an optical finder, of a translucent screen in said finder onto which an image of the object to be observed is projected, of a quartz rod extending from said screen towards said element, and means resiliently supporting one end of said rod.

10. In a pyrometer the combination with a radiant energy sensitive element and means registering the reactions of said element, of an optical finder, of a translucent screen in said finder onto which an image of the object to be observed is projected, and of a quartz rod irradiated by way of said finder and extending from the level of said screen towards said element.

11. In a pyrometer the combination with a radiant energy sensitive element and means registering the reactions of said element, of a camera obscura, of means opening upon said camera obscura and conducting part of the radiant energy received in said camera to said element, and of a lens focused upon the rear of said camera obscura for observing the radiant energy received in said camera.

12. In a portable pyrometer, a housing, a radiant energy sensitive element in said housing, means translating the fluctuations impressed upon said element, an optical finder mounted on said housing, a radiant energy conductor facing in the direction of said finder and issuing upon said element, and adjustable optical systems at both ends of said finder for adjusting it as a telescope as well as in relation to said conductor.

MAX LASKY.
CLARENCE P. WOOD.